US008595489B1

(12) United States Patent
Faaborg et al.

(10) Patent No.: US 8,595,489 B1
(45) Date of Patent: Nov. 26, 2013

(54) GROUPING AND RANKING OF APPLICATION PERMISSIONS

(71) Applicant: Google Inc., Mountain View, CA (US)

(72) Inventors: Alexander Faaborg, Mountain View, CA (US); Adrian Ludwig, Atherton, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/668,493

(22) Filed: Nov. 5, 2012

Related U.S. Application Data

(60) Provisional application No. 61/719,693, filed on Oct. 29, 2012.

(51) Int. Cl.
*H04L 29/06* (2006.01)
(52) U.S. Cl.
USPC .......................................................... 713/166
(58) Field of Classification Search
None
See application file for complete search history.

(56) References Cited

U.S. PATENT DOCUMENTS

| 2005/0119902 | A1* | 6/2005 | Christiansen .................. 705/1 |
| 2010/0235823 | A1 | 9/2010 | Garbers et al. |
| 2012/0072991 | A1 | 3/2012 | Belani et al. |
| 2012/0110174 | A1 | 5/2012 | Wootton et al. |

OTHER PUBLICATIONS

Kameka, Andrew, Android PSA: Read security permissions before installing an Android app, http://android-phones.ca/2010/07/android-psa-read-security-permissions-before-installing-an-android-app/, published Jul. 29, 2010, accessed on May 29, 2013.*
Lund, Emmanuel, Discover who's making a pass and your Android, Nov. 18, 2011, http://www.appszoom.com/android_applications/tools/permission-friendly-apps_bqeyr.html, accessed on Sep. 16, 2013.*

* cited by examiner

*Primary Examiner* — Brandon Hoffman
(74) *Attorney, Agent, or Firm* — McDonnell Boehnen Hulbert & Berghoff LLP

(57) ABSTRACT

The present disclosure provides a system and method for a mobile device to run an application that requires one or more permissions. The mobile device may comprise a screen and a processor. The one or more permissions may be displayed graphically on the screen prior to the application being installed by the processor.

20 Claims, 10 Drawing Sheets

300

409 — fine (GPS) location course (network-based) location mock location sources for testing access extra location provider commands permission to install a location provider 411 — modify your contacts read your contacts read call log write call log read your social stream write to your social stream 413 — read your own contact card modify your own contact card 415 — read your Web bookmarks and history write your Web bookmarks and history

FIG. 4B

DEVICE ACCESS

501 📶 full Internet access view network connections view Wi-Fi connections view WiMAX connections change network connectivity connect and disconnect from Wi-Fi connect and disconnect from WiMAX control Near Field Communication 503 ✱ access bluetooth settings pair with bluetooth devices 505 ⏭ retrieve running apps reorder running apps close other apps run at startup make app always run 507 🗔 draw over other apps

FIG. 5A

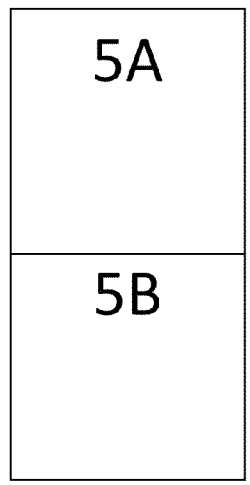

FIG. 5B

509 — control vibration / control flashlight / prevent phone from sleeping / allow Wi-Fi Multicast reception 511 — adjust wallpaper size / set wallpaper 513 — set time / set time zone 515 — change your audio settings 517 — read sync settings / toggle sync on and off / read sync statistics 519 — expand/collapse status bar 521 — modify system settings 523 — measure app storage space / send sticky broadcast / delete all app cache data / mock location sources for testing / access extra location provider commands / permission to install a location provider

600

700

GROUPING AND RANKING OF APPLICATION PERMISSIONS

FIELD

Certain embodiments of the disclosure relate to computer applications. More specifically, certain embodiments of the disclosure relate to a method and system for informing a device user of the permissions that will be granted when a computer application is installed on the device.

BACKGROUND

Mobile communications have changed the way people communicate and mobile devices have been transformed from a luxury item to an essential part of everyday life. As the number of mobile devices continues to increase, significant efforts exist with regard to making such devices more secure and more user-friendly. User interfaces exist that allow a user to read permissions for a given application. However, current user interfaces may be presented in such a way that the user is unable to comprehend the grant of permissions. Therefore, any information about the permissions is ignored.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A method and system is provided for ranking and clustering of application permissions based on potential damage, substantially as shown in and/or described in connection with at least one of the figures, as set forth more completely in the claims. For example, an application may request permission to personal information and/or device utilities. An operating system can cluster the requested permissions into groups and rank the groups of requested permissions according to an implication of potential damage. A user interface can display a text description of the ranked and clustered permissions. To improve the speed of comprehension, the user interface may also display an informative graphic near the text description.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 4A, 4B and 4C illustrate example clusters of permissions related to privacy, in accordance with an embodiment of the disclosure.

FIGS. 5A and 5B illustrate example clusters of permissions related to device access, in accordance with an embodiment of the disclosure.

DETAILED DESCRIPTION

Previous operating systems have relied on software being physically sold in boxes in stores. This model protected users because there was implicit trust in the store not to sell boxes of software that were dangerous or malicious. Modern operating systems have to deal with hundreds of thousands of applications that are available in online stores. Because of this, modern operating systems must be much more restrictive of what capabilities an application has access to. If there are too many applications for the store to review itself, the decision to trust an application moves from the store on to the user. Additionally, each users may have different tolerance levels for how much personal information they would like to expose to an application, so ultimately the decision to install an application or not is theirs.

Figure 1:
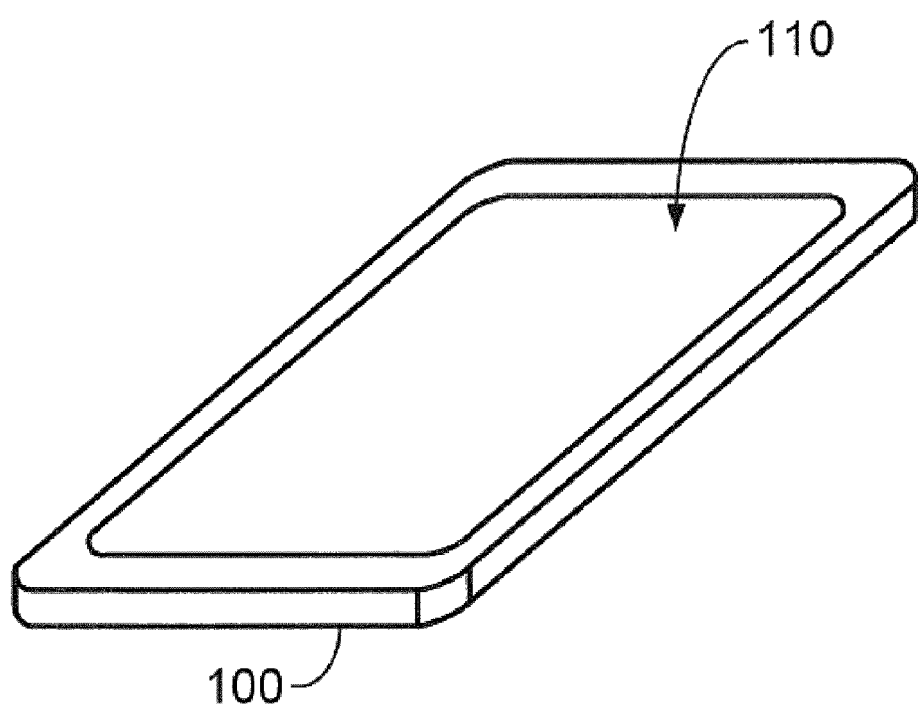
FIG. 1 is a diagram of an example mobile device, in accordance with an embodiment of the disclosure.

Certain embodiments of the disclosure may be found in a method and system for displaying the permissions requested by an application at the time of installation. Mobile devices, such as smartphones and tablets, may provide a platform for installing and running these applications. FIG. 1 is a diagram of an example mobile device 100 that is able to install and run applications in accordance with an embodiment of the disclosure. Many smartphones and tablets include a touch screen 110 to provide user input and output.

This disclosure provides for ranking and clustering of application permissions based on potential damage, substantially as shown in and/or described in connection with at least one of the figures, as set forth more completely in the claims. For example, an application requests permission to personal information and/or device utilities. An operating system may cluster the requested permissions into groups. The groups of requested permissions may then be ranked according to an implication of potential damage. A user interface can display a text description of the ranked and clustered permissions. To improve the speed of comprehension, the user interface can also display an informative graphic near the associated text description.

It is important that users comprehend what permissions they are granting to an application during installation. These permissions may allow the application to potentially harm the user's privacy, and may potentially degrade the ability of the device to function. Permission lists are traditionally organized by areas of specific hardware or software stacks (e.g., sensors, network, vibration), as opposed to actual implications of the permissions (e.g., things that will degrade the battery life). Additionally, permission lists may not differentiate between permissions that could harm the device versus permissions that could harm the user. Permission lists are often jargon filled and technical, and read more like documentation for an application programming interface (API) than an interface that is designed to help users make informed decisions about a particular application. Permissions that are framed in terms of the device as opposed to being framed in terms of the user may be ignored, since a user may not be able to quickly determine if an application is potentially dangerous or not.

Consent to permissions may be granted at install time or in real time as the permissions are needed. The advantage of granting permissions at install time is that the user can make a comprehensive decision whether they trust a particular application by viewing everything that the application that the application will want to do in the future. Furthermore, the user can potentially understand how various permissions could be used in combination. Granting permissions at install time is also advantageous for developers, since the developer can program an application without being worried that it will only have access to a subset of permissions and capabilities.

Figure 2:
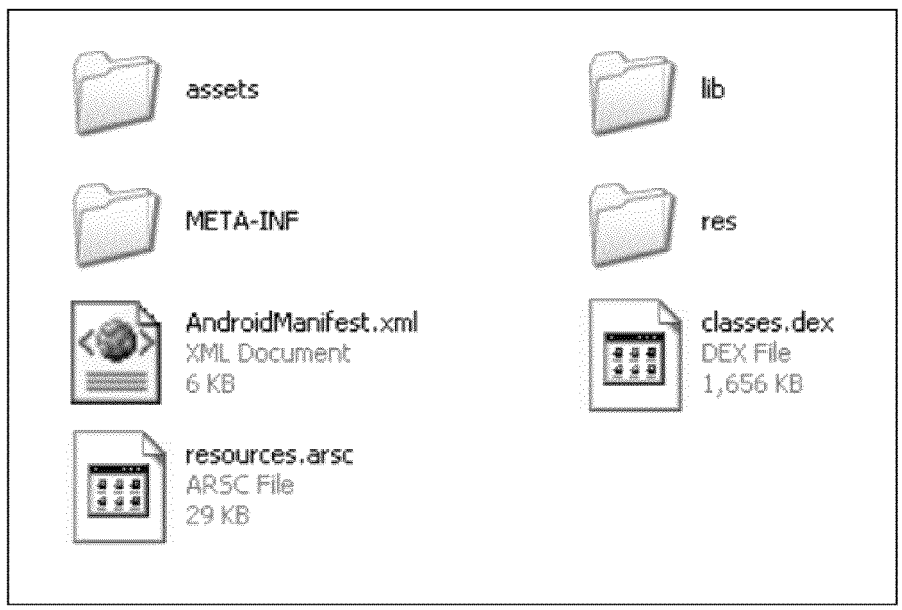
FIG. 2 is an example of an archive that contains folders that may store an example application, in accordance with an embodiment of the disclosure.

FIG. 2 is an example of an archive that contains folders that may store an example application, in accordance with an embodiment of the disclosure. For example, an Android application package file (APK) is the file format used to distribute and install application software and middleware onto Google's Android operating system. To make an APK file, a program for Android is first compiled, and then all of its parts are packaged into one file. APK files can have any name needed, but must end with the extension, .apk.

Android applications are written in the Java programming language. The Android SDK tools compile the code—along with any data and resource files—into an Android package, an archive file with an .apk suffix. All the code in a single APK file is considered to be one application and is the file that Android-powered devices use to install the application. An APK file may contain individual files such as: 1) an Android-Manifest.xml file, which is a Manifest file that describes the name, version, access rights, and referenced library files for the application; 2) a classes.dex file, which is associated with the process virtual machine (Dalvik) in Google's Android operating system; and 3) a resources.arsc file, which contains pre-compiled resources. An APK file may also contain directories such as: 1) a META-INF directory, which may contain a certificate of the application and a list of resources; 2) a lib directory, which may contain the compiled code that is specific to a software layer of a processor; 3) a res directory, which contains resources not compiled into resources.arsc; and 4) assets directory.

The Manifest file identifies any user permissions the application requires, such as Internet access or read-access to the user's contacts. The Manifest file may also declare the minimum API level required by the application, based on which APIs the application uses. The Manifest file may declare hardware and software features used or required by the application, such as a camera, Bluetooth services, or a multi-touch screen.

An application declares all its components in the Manifest file, which is at the root of the application project directory. Before the Android system starts an application component that requires a permission, the existence of that permission in the Manifest file is verified. Activities, services, and content providers that are included in the source but are not declared in the Manifest file are not visible to the system and, consequently, can never run.

There are a variety of devices powered by Android and not all of them provide the same features and capabilities. Hardware and software features may or may not exist on a given Android-powered device, such as a camera, a light sensor, Bluetooth, a certain version of OpenGL, or the fidelity of the touchscreen. In order to prevent an application from being installed on devices that lack features needed by the application, device and software requirements are declared in the Manifest file. For example, if an application requires a camera, this requirement should be declared in the manifest file, and devices that do not have a camera cannot install the application. However, you can also declare that the application uses the camera, but does not require it. In that case, the application performs a check at runtime to determine if the device has a camera and disable any features that use the camera if one is not available.

The Android system implements the principle of least privilege. That is, each application, by default, has access only to the components that it requires to do its work and no more. This creates a very secure environment in which an application cannot access parts of the system for which it is not given permission. For example, an application can request permission to access device data such as the user's contacts, SMS messages, the mountable storage (SD card), camera, Bluetooth, and more. All application permissions must be granted by the user at install time.

An aspect of the Android system design is that any application can start another application's component. For example, if you want the user to capture a photo with the device camera, there's probably another application that does that and the application can use it, instead of developing an Activity to capture a photo yourself. You don't need to incorporate or even link to the code from the camera application. Instead, you can simply start the Activity in the camera application that captures a photo. When complete, the photo is even returned to the application so you can use it. To the user, it seems as if the camera is actually a part of the application.

Because the system runs each application in a separate process with file permissions that restrict access to other applications, the application cannot directly activate a component from another application. The Android system, however, can. So, to activate a component in another application, you must deliver a message to the system that specifies the intent to start a particular component. The system then activates the component for you.

An Android application is composed of more than just code—it utilizes resources that are separate from the source code, such as images, audio files, and anything relating to the visual presentation of the application. For example, you should define animations, menus, styles, colors, and the layout of activity user interfaces with XML files. Using application resources makes it easy to update various characteristics of the application without modifying code and—by providing sets of alternative resources—enables you to optimize the application for a variety of device configurations (such as different languages and screen sizes).

A permission can be given a relative priority based on how dangerous the permission could potentially be to the user. The permission may also be sorted into one of two groups— permissions that can harm the user (Privacy), and permissions that can only harm the state of the device (Device Access). Privacy permissions are placed in the interface before Device Access permissions. Permissions may be evaluated by the worst case scenario of the effects, and permission groups can be ranked based on potential damage. The potential damage may relate to a user's privacy. Also, the potential damage may relate to a degradation of a current state of the device, e.g., a drain on the battery.

Permissions may also be clustered based on the effect of the permission. For instance, controlling the flashlight, controlling vibration, and turning on Wi-Fi multicast are permission that may all be clustered together, since they affect battery life of the device.

An icon for each cluster may be designed so that users can visually parse the interface at a quick glance without having to do a slow linear scan of all of the text. A user can process considerably more information in less time by doing a quick visual scan of icons displayed. For side-loaded applications and market installs, users may be required to review the entire list of application permissions prior to hitting an install button. The use of icons may speed this process.

Any OS that provides applications limited access to hardware and personal information should deploy this approach to designing the consent screen. This ranking and clustering of permissions is not limited to mobile operating systems but may also be used on any desktop operating system that uses a model of restricted application permissions.

Figure 3:
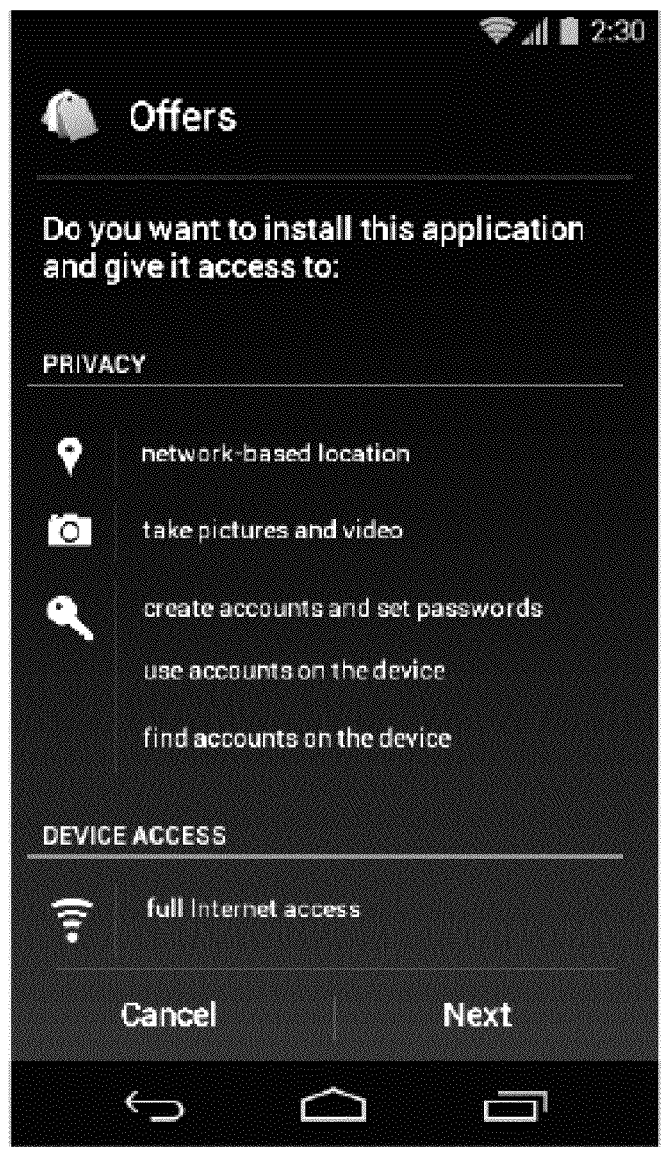
FIG. 3 is an example user interface illustrating application permissions, in accordance with an embodiment of the disclosure.

FIG. 3 is an example of a user interface 300 illustrating application permissions, in accordance with an embodiment of the disclosure. In this example, the application "Offers" is requesting access to permissions at the time of installation. These ranked permissions are to: access network-based location, take pictures and video; create accounts and set passwords; use accounts on the device; find accounts on the device; and gain full internet access.

Figure 4A:
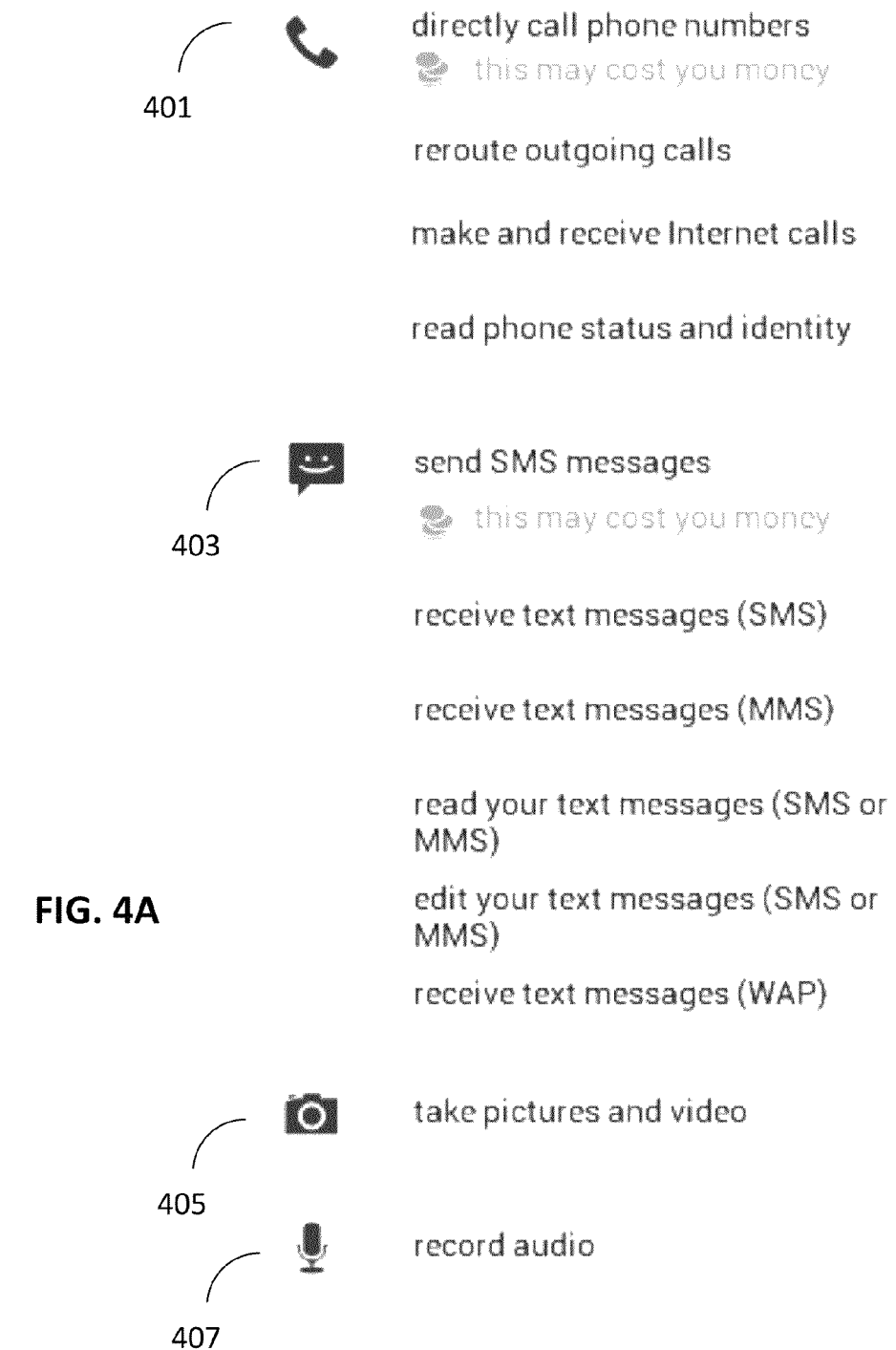
Figure 4C:
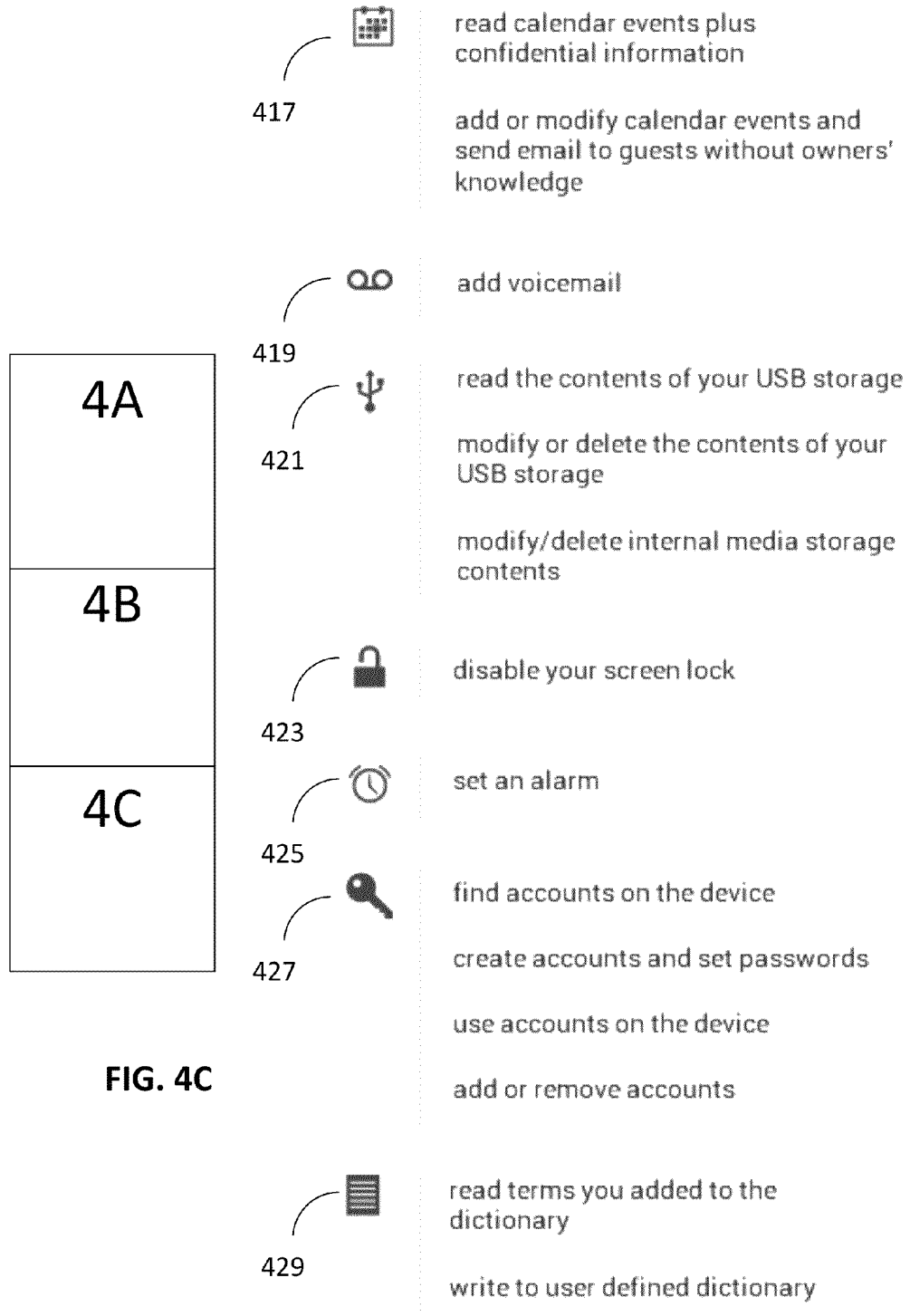

FIGS. 4A, 4B and 4C illustrate example clusters of permissions related to privacy, in accordance with an embodiment of the disclosure. Permissions related to privacy may have implications to the device user even after the device is destroyed. An application that has permission to access data on a device may, for example, intentionally or unintentionally copy incriminating facts or photographs. Such a worst case scenario may result in damage to a person's reputation or credibility. However, the device would experience no damage.

Permissions related to telephone information and capabilities may be the most potentially harmful rights that an application would request. This cluster may be designated with a telephone icon 401. Additionally, the permissions in this cluster may be displayed at the top of a user interface. Privacy related permissions also include: messaging permissions that may be identified with a text balloon icon 403; photographing permissions that may be identified with a camera icon 405; audio recording permissions that may be identified with a microphone icon 407; location permissions that may be identified with a map pin icon 409; social media permissions that may be identified with a group of people icon 411; contact card permissions that may be identified with a person icon 413; bookmarking permissions that may be identified with a clock and star icon 415; calendar permissions that may be identified with a calendar icon 417; voicemail permissions that may be identified with a tape recorder icon 419; storage permissions that may be identified with a USB icon 421; screen lock permissions that may be identified with a padlock icon 423; alarm permissions that may be identified with a ringing clock icon 425; password permissions that may be identified with a key icon 427; and dictionary permissions that may be identified with a page icon 429.

FIGS. 5A and 5B illustrate example clusters of permissions related to device access, in accordance with an embodiment of the disclosure. Permissions related to local area network access may be the most potentially harmful rights that an application would request related to the operation of a device. This cluster may be designated with a radio antenna icon 501. Additionally, the permissions in the local area network access cluster may be displayed at the top of a user interface in a device access section. Device access related permissions also include: Bluetooth permissions that may be identified with a Bluetooth icon 503; permissions to control other applications that may be identified with an overlapping window icon 505; drawing permissions that may be identified with a dotted window icon 507; power-reducing permissions that may be identified with a battery icon 509; wallpaper permissions that may be identified with a framed picture icon 511; time permissions that may be identified with a clock icon 513; audio permissions that may be identified with a speaker icon 515; syncing permissions that may be identified with a cycle icon 517; status bar permissions that may be identified with a bar icon 519; system permissions that may be identified with an equalizer control icon 521; and application management permissions that may be identified with a gear icon 523.

Figure 6:
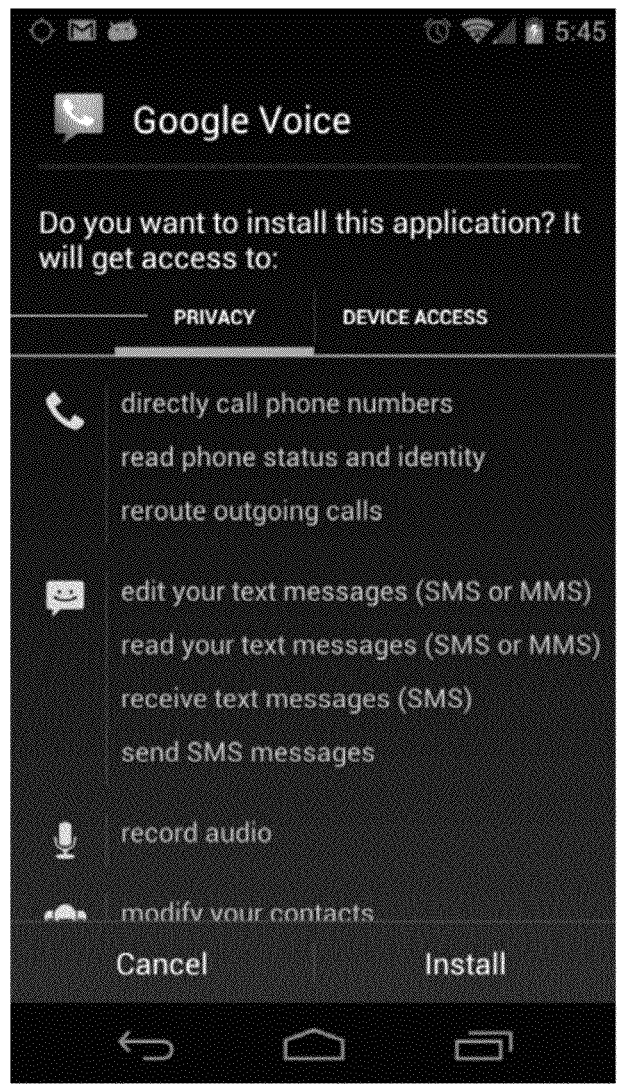
FIG. 6 is an example user interface illustrating application permissions related to privacy, in accordance with an embodiment of the disclosure.

FIG. 6 is an example of a user interface 600 illustrating application permissions related to privacy, in accordance with an embodiment of the disclosure. Permissions that can damage the user are displayed immediately on screen. This information is isolated from less important permissions related to accessing the device (e.g., controlling the flashlight) to improve their relative discoverability.

Figure 7:
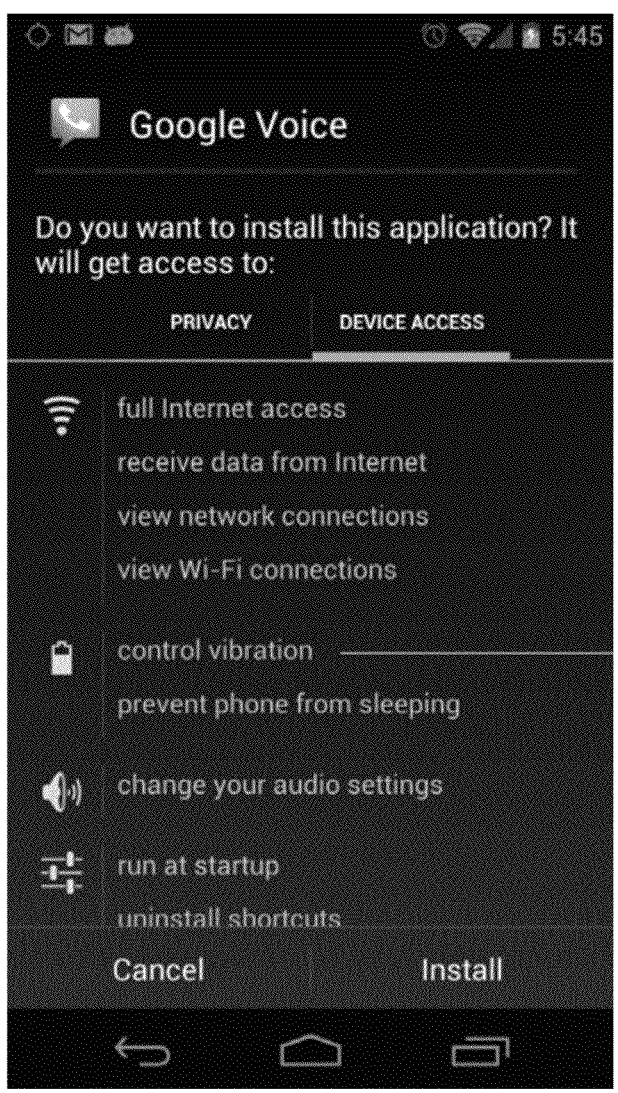
FIG. 7 is an example user interface illustrating application permissions related to device access, in accordance with an embodiment of the disclosure.

FIG. 7 is an example of a user interface 700 illustrating application permissions related to device access, in accordance with an embodiment of the disclosure. The UI 700 focuses on the effects instead of the causes. For instance vibration and preventing the phone from sleeping are grouped with a battery icon, because the most negative result of these permissions is that the battery life is reduced.

Accordingly, the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A device operable to run an application that requires one or more permissions, wherein the device comprises:
   a screen that operates to display the one or more permissions graphically prior to the application being installed, wherein a permission in the one or more permissions is associated with a group according to a potential for causing an effect, and wherein the permission is associated with a rank within the associated group according to a severity of the effect; and
   a processor that operates to install the application.

2. The device of claim 1, wherein the rank determines a relative location for display on the screen.

3. The device of claim 1, wherein a permission associated with a first group has a potential for causing an effect related to an invasion of privacy.

4. The device of claim 3, wherein a permission associated with a second group has a potential for causing an effect related to a degradation of a current state of the device.

5. The device of claim 4, wherein the first group is displayed above the second group.

6. The device of claim 1, wherein the one or more permissions are displayed graphically with an icon.

7. The device of claim 6, wherein each permission that has a potential for causing a similar effect is displayed with the same icon.

8. A method for communicating one or more permissions, wherein the method comprises:
- receiving a request to install an application that requires the one or more permissions;
- associating each permission in the one or more permissions with a potential effect;
- grouping the one or more permissions into one or more groups according to the associated potential effect of each permission;
- ranking the one or more permissions within the one or more groups; and
- graphically displaying the one or more ranked permissions prior to installing the application.

9. The method of claim 8, wherein the one or more permissions are ranked according to an undesirability of the associated potential effect of each permission.

10. The method of claim 8, wherein the potential effect of each permission in one group is related to an invasion of privacy.

11. The method of claim 8, wherein the potential effect of each permission in one group is related to a degradation of a current state of the device.

12. The method of claim 8, wherein a permission that could affect privacy is displayed above a permission that could affect the device.

13. The method of claim 8, wherein the one or more permissions are displayed graphically by an icon.

14. The method of claim 13, wherein two permissions, each associated with a common effect, are displayed graphically by the same icon.

15. A system for controlling a device, wherein the system comprises:
- a memory for storing a plurality of applications; and
- a processor operable to communicate one or more permissions required by an application prior to installation;
  - wherein each permission in the one or more permissions is associated with a potential effect;
  - wherein the one or more permissions are categorized into one or more groups according to the associated potential effect of each permission; and
  - wherein the one or more permissions are ranked to determine a relative location for display within the one or more groups.

16. The system of claim 15, wherein the rank of each of the one or more permissions is based on an undesirability of the associated potential effect of each permission.

17. The system of claim 16, wherein the undesirability of one group is related to a damage to privacy.

18. The system of claim 16, wherein the undesirability of one group is related to a degradation of a current state of the device.

19. The system of claim 16, wherein a permission that could affect privacy is displayed above a permission that could affect to the device.

20. The system of claim 16, wherein the one or more permissions are displayed graphically by an icon.

* * * * *